United States Patent Office 3,379,729
Patented Apr. 23, 1968

3,379,729
PIPERAZINYLDIBENZOTHIEPINS
Miroslav Protiva, Ivo Jirkovský, Karel Pelz, Jiřina Metyšová and Ivan Ernest, Prague, Czechoslovakia, assignors to Spofa, Spojene podniky pro zdravotnickou výrobu, Prague, Czechoslovakia
No Drawing. Filed June 21, 1966, Ser. No. 559,078
Claims priority, application Czechoslovakia, June 22, 1965, 4,041/65
14 Claims. (Cl. 260—268)

ABSTRACT OF THE DISCLOSURE

A new composition of matter having therapeutic properties and consisting of a compound selected from the group consisting of heterocyclic compounds of the general formula:

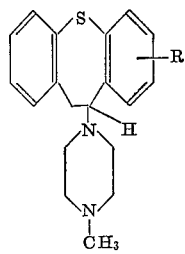

wherein R is selected from the group consisting of alkyl, perfluoroalkyl, alkoxyl, alkylmercapto, alkanesulfonyl and dialkylsulfamyl with 1–4 carbon atoms, the nitro group, and salts thereof.

---

The present invention relates to new heterocyclic compounds and to a method of preparing and using the same.

It is an object of the present invention to provide new heterocyclic compounds possessing pharmacodynamical activity and a method of producing these compounds.

It is another object of the present invention to provide compounds and a method of producing the same, which compounds are effective in the treatment of chronic psychoses, endogenous depressions and neuroses.

It is a further object of the present invention to provide a pharmaceutical composition incorporating as effective ingredient a compound of the present invention.

It is still another object of the present invention to provide a method of treating patients suffering from chronic psychoses, endogenous depression, neurosis and the like.

Other objects and advantages of the present invention will become apparent from a further reading of the description and of the appended claims.

With the above and other objects in view, the present invention includes as a new composition of matter, a compound selected from the group consisting of heterocyclic compounds of the general formula:

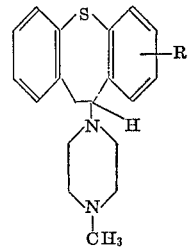

wherein R is selected from the group consisting of alkyl, perfluoroalkyl, alkoxyl, alkylmercapto, alkanesulfonyl and dialkylsulfamyl with 1–4 carbon atoms, the nitro group, and salts thereof.

The present invention is also concerned with a method of preparing a compound of the general formula:

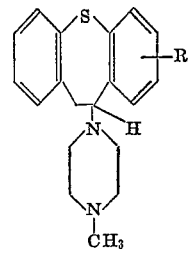

wherein R is selected from the group consisting of alkyl, perfluoroalkyl, alkoxyl, alkylmercapto, alkanesulfonyl and dialkylsulfamyl with 1–4 carbon atoms, and the nitro group, comprising the steps of reacting an ester of a secondary alcohol of the general formula:

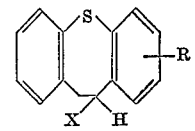

wherein R has the same meaning as above and X is an acid residue, with N-methylpiperazine.

It is also within the scope of the present invention to provide a pharmaceutical composition for oral administration in the treatment of chronic psychoses, endogenous depressions, neuroses and the like, which pharmaceutical composition consists essentially of a compound according to the present invention and a pharmaceutical diluent.

Furthermore, the present invention proposes a method of treating a patient suffering from chronic psychosis, endogenous depression or neurosis, which method comprises the step of administering to the patient an effective amount of the compound of the present invention. Preferably, treatment is carried out by oral administration of the above described pharmaceutical composition.

Thus, the present invention relates to new heterocyclic compounds of the general formula:

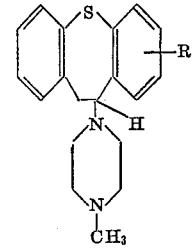

(I)

wherein R is selected from the group consisting of alkyl, perfluoroalkyl, alkoxyl, alkylmercapto, alkanesulfonyl and dialkylsulfamyl all with 1–4 carbon atoms, the nitro group, and salts thereof, and a method of preparing the same.

The heterocyclic compounds of the above described general formula and the salts thereof have been found to possess a surprising and remarkably outstanding pharmacodynamical activity. They may be described as a group of multipotent neurotropic and psychotropic substances. The most typical effect thereof is their central sedative and neuroleptic activity which has been verified in a series of pharmacological tests. Thus, e.g. in the test with a rotating rod, the substances according to the invention show a very strong and long lasting sedative effect, which is substantially stronger than that of chloropromazine. The mean effective dose of these substances varies within a range of about 0.01 and 0.1 mg. per 1 kg. weight of the experimental animals (see table). In this test the effect sets in within 10 minutes on intravenous administration, and is evident even after 24 hours.

Typical is the effect of the substances according to the invention upon the locomotoric activity in mice. In this test the difference between the new substances and chloropromazine, to the advantage of the former, is still more apparent. Using the ray method according to Dews, the substances according to the present invention suppress the locomotory activity of mice (placed by 3 in a glass cylinder) to 50% of the average control values when administered in dosages of 30–100 mg./kg., while chloropromazine becomes effective only at a dose of almost 700 mg./kg. At the same time the toxicity of the new substances is approximately equal to chloropromazine (see table). This results in a many times more advantageous therapeutic index for the new compounds or substances.

The substances according to the invention potentiate the thiopental narcosis in mice in doses by 10 times lower than chloropromazine (see table), and with similar doses they significantly decrease the body temperature in mice. By intraperitoneal administration of the substances according to the invention, in doses 1–2, 5 mg./kg., in rats a typical cataleptic effect can be evoked.

In experiments in vivo with rats, the substances according to the invention suppress the effect of serotonine applied subplantary into the hind paw, already in doses starting from 0.5 mg./kg. intraperitoneally. They also show an antihistaminic and antiemetic activity.

According to the invention, the most typical substances are: 8 - methyl - 10 - (4 - methylpiperazino) - 10,11-dihydrodibenzo(b,f)-thiepine (in the form of its maleate), which will be identified as "meperathiepine", and 8-methoxy - 10 - (4 -methylpiperazino) - 10,11 - dihydrodibenzo(b,f)thiepine (also in the form of its maleate), which is identified as "octometothepine."

In the table given further below, the toxicity of these substances and the central sedative effect thereof as shown in the three basic tests is compared with the toxicity and activity of chloropromazine, and in addition, with that of "perathiepine," i.e. 10 - (4 - methylpiperazino)-10,11-dihydrodibenzo(b,f)thiepine, which is the basic substance unsubstituted in the benzene nucleus of all the group of neurotropic derivatives of 10-piperazino - 10,11 - dihydrodibenzo(b,f)thiepine. From the values shown, such as therapeutical effect indices, it is immediately apparent that the substances according to the invention demonstrate a significant progress over the basic substance of the chemically corresponding group, i.e. in comparison with chloropromazine, which is the typical representative of neuroleptics of the phenothiazine series.

In the clinical practice, the applicability of the substances according to the invention will be found primarily in psychiatry. The compounds of the present invention in the treatment of psychomotoric discomposure and perturbation, anxious states, melancholy, chronic delirant hallucinatory states, schizophrenia, anxious and obsessional neuroses resistant to treatment with some other ataractics, such as various confusion states of various origin (senile dementia, postcometative confusion, etc). Broadly, the compounds of the present invention appear indicated in the treatment of acute and chronic psychoses, endogenous depressions, and neuroses.

The dosage and time of treatment is strictly individual, and is governed by the indication given, the clinical disease picture, and by the sensitivity of the patient with respect to the preparation. With regard to the individual differences, the optimum daily dose may vary within the range of 10–30 mg. administered in 1–3 doses. The compounds of the present invention, such as meperathiepine and octometothepine, are applied orally in the form of drages or tablets containing 5 or 10 mg. of the substance (calculated on the base content in the respective salt).

TABLE 1

|  | (a) Toxicity, mg./kg. LD 50 | (b) Rotating rod, mcg./kg. ED 50 | (c) Effect index, LD 50/ED 50 | (d) Locomotoric activity, mg./kg. D 50 | (e) Potentiation of thiopental |
|---|---|---|---|---|---|
| Meperathiepine | 54 | 135 | 400 | 63.9 | 12.1+ |
| Octometothepine | 38 | 49 | 775 | 30.5 | 8.0+ |
| Chloropromazine | 52.2 | 585 | 89 | 693 | 5.7+ |
| Perathiepine | 42.3 | 187 | 252 | 156 | 7.9+ |

(a) Acute toxicity in mice, in intravenous administration. Quoted as mean lethal dose values—LD 50.
(b) The values quoted are the mean effective doses (ED 50) determined in the time space of the maximum effect. The test has been carried out in mice with intravenous administration.
(c) The ratio of toxicity and effect values in the rotating rod test, i.e. LD 50/ED 50.
(d) The values quoted (D 50) are the doses necessary for suppressing the locomotoric activity of mice to 50% of the control value.
(e) The values quoted are comparative sleeping time spaces of mice after a constant dose of thiopental, whereas the sleeping time after thiopental alone is given the arbitrary value 1. Meperathiepine and octometothepine were administered intravenously in a dose corresponding to 0.25% of the LD 50/kg. value, while chloropromazine and perathiepine were administered in a dose corresponding to 2.5% of the LD/kg. value. Even with this test arrangement meperathiepine prolongs the thiopental sleep about twice as much as chloropromazine.

The new compound of the present invention may be prepared by reacting a secondary alcohol ester of the formula:

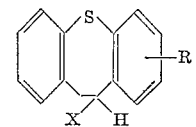

(II)

wherein R has the same meaning as in Formula I, and X may be Cl, Br, J, $CH_3SO_3$ or $p\text{-}CH_3C_6H_4SO_3$, with inorganic acids, especially of the corresponding halides, alkane- and aryl-sulfonates, with 1-methylpiperazine

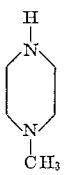

(III)

The basic products thus obtained are then converted to the respective salts by neutralization with inorganic or organic acids.

The reaction may consist in the condensation of the corresponding chloro derivatives with 1-methylpiperazine, and is carried out e.g. by heating together the two components without any solvent, or by heating the components in suitable solvents (ethers, alcohols, aromatic hydrocarbons), contingently in the presence of alkaline condensation agents (alkali metal carbonates, pyridine, triethylamine, etc.). The salts obtained by neutralization are mostly crystalline, and at least moderately water-soluble. If pharmacologically harmless acids were used for neutralizing, the salts obtained are suitable for preparing pharmaceutical products. As acids which may be employed for producing these salts preferably those will be chosen which, per se, are without pharmacological effect and/or are physiologically harmless. These preferred acids include hydrochloric acid, hydrobromic acid, maleic acid, fumaric acid, succinic acid, citric acid, tartaric acid, and the like.

The conversion of the base into the corresponding maleate or hydrogen-maleate is described in some of the examples. Generally, the salt may be formed by neutralizing the base with an equivalent amount of the chosen acid. Neutralizing is preferably carried out in a suitable solvent in which the reactants are highly soluble, whereas the desired salt is only slightly or not at all soluble therein. In most cases ethanol or ethanol-ether mixtures have been found to be desirable solvents for this purpose.

The following examples are given as illustrative only without, however, limiting the invention to the specific details of the examples.

EXAMPLE I 8-methyl-10-(4-methylpiperazino)-10,11-dihydrodibenzo(b,f)-thiepine ("meperathiopine")

A mixture of 6.7 g. 8-methyl-10-chloro-10,11-dihydrodibenzo(b,f)thiepine and 11 ml. N-methylpiperazine is heated for 3 hours to 100–110° C., and thereupon left to stand overnight at room temperature. The reaction mixture obtained is mixed with 70 ml. water, and the liquid is extracted three times with 50 ml. benzene each. The basic product is transferred from the benzene solution by shaking into 60 ml. dilute hydrochloric acid (1:3), the acid aqueous solution is diluted with water, filtered, and alkalized with a 20%-solution of sodium hydroxide. The base liberated is extracted with benzene, the extract washed with water and sodium chloride solution, and dried with anhydrous potassium carbonate. The benzene is then evaporated, the residue dissolved in a small amount of boiling ethanol, and 6.0 g. of maleic acid are added to the solution. The salt crystallizes and is purified by recrystallizing from boiling ethanol. There is obtained 6.9 g. of pure 8-methyl-10-(4-methylpiperazino)-10,11-dihydrodibenzo(b,f)thiepine-hydrogenmaleate, melting at 160–162° C., and conforming to the presumptive summary formula: $C_{28}H_{32}N_2O_8S$. It is soluble in cold water to form a 1%-solution.

The starting 8-methyl-10-chloro-10,11-dihydrodibenzo-(b,f)-thiepine is prepared from the known 4'-methyldiphenylsulfide-2-carboxylic acid by the following procedure:

A suspension of 43.0 g. of the said acid in 700 ml. absolute ether is reduced with a solution of 14.0 g. lithium-aluminum hydride in an additional 200 ml. ether. After a slow mixing of the two components, the reaction mixture is boiled for 4 hours under reflux while stirring. On cooling down it is cautiously decomposed by dropwise addition of 15 ml. water and thereupon with dilute sulfuric acid. The ethereous layer is separated, washed with water, and dried with anhydrous sodium hydroxide. Ether is evaporated, and the residue distilled in vacuo. There is obtained 34.4 g. 2-hydroxymethyl-4'-methyldiphenylsulfide having a boiling point of 185–188°/5 mm.

To a solution of 33.1 g. of the alcohol obtained in 11.4 g. absolute pyridine, 17.1 g. thionyl chloride is slowly dropwise added while stirring and under external cooling. The mixture is stirred for 1 hour under continuous external cooling with ice and water, and then for another hour at room temperature. Thereupon it is diluted with water and extracted with ether. The ethereous solution is washed with 5%-sodium hydrogen carbonate, water, and a saturated sodium chloride solution, dried with calcium chloride, and processed by distillation. There is obtained in a yield of 28.7 g. 2-chloromethyl-4'-methyldiphenylsulfide having a boiling point of 178–180°/5 mm. It crystallizes upon standing, and on recrystallization from petroleum ether it has a melting point of 37–38°.

To a solution of 7.0 g. sodium cyanide in 15 ml. water and 30 ml. ethanol, a solution of 22.8 g. of the aforesaid chloride in 30 ml. dioxane is added, and the mixture refluxed under stirring for 6 hours. After cooling down, the mixture is evaporated under reduced pressure, and the residue is distributed between water and benzene by shaking. The benzeneous solution is washed with water, sodium chloride solution, and dried. By evaporation there is obtained 21.8 g. of 2-cyanomethyl-4'-methyldiphenylsulfide melting on recrystallization from methanol at 61–62°. It can be purified as well by distillation; boiling point 189–190°/4 mm.

To a solution of the aforesaid nitrile in 110 ml. ethanol, a solution of 22 g. potassium hydroxide in 40 ml. water is added, and the mixture refluxed for 6 hours. The major part of the ethanol evaporates and the remaining liquid is acidified after cooling with hydrochloric acid. The precipitated product, after being sucked off, is recrystallized from aqueous methanol. There is obtained altogether 16.8 g. of pure 4'-methyldiphenylsulfide-2-acetic acid having a melting point of 116–117° (benzene-petroleum ether).

A mixture of 70 g. polyphosphoric acid and 8.8 g. of the aforesaid acid is heated while stirring for 1 hour to 110° and for another 3 hours to 140°. On cooling down, it is decomposed with water and extracted with benzene. The benzeneous solution is freed from acidic portions by washing with sodium carbonate solution, is further on washed with water and with a saturated sodium chloride solution, dried with sodium sulfate, and evaporated. By crystallizing the residue from petroleum ether there is obtained 7.9 g. of 8-methyl-10-oxo-10,11-dihydrodibenzo(b,f)-thiepine having a melting point of 68–69°. The infrared spectrum of the product shows the typical absorption band at 1686 cm.$^{-1}$, corresponding to a keto group conjugated with an aromatic nucleus.

A solution of 10.9 g. of the aforesaid ketone in 35 ml. dioxane and 35 ml. of a 90%-methanol is reduced by addition of 5.5 g. of sodium borohydride. The mixture is left to stand for 12 hours at room temperature, evaporated at reduced pressure, and the residue is distributed between water and an ether-benzene mixture (1:1). The organic phase is washed with water, sodium chloride solution, dried with sodium sulfate, and evaporated. By crystallizing the residue from petroleum ether there is obtained 9.9 g. of 8-methyl-10-hydroxy-10,11-dihydrodibenzo(b,f)thiepine, having a melting point of 70–72°.

To a solution of 9.6 g. of the foregoing alcohol in 80 ml. absolute benzene, 5 g. of powdered anhydrous calcium chloride is added, and the mixture is saturated for 1 hour with a stream of anhydrous hydrogen chloride. It is thereupon filtered and evaporated. By crystallization of the residue from petroleum ether there is obtained 9.4 g. of 8-methyl-10-chloro-10,11-dihydrodibenzo(b,f)thiepine, having a melting point of 127–128°.

EXAMPLE II 8-tert.butyl-10-(4-methylpiperazino)-10,11-dihydrodibenzo(b,f)thiepine A mixture of 12 g. of crude 8-tert.butyl-10-chloro-10, 11 - dihydrodibenzo(b,f)thiepine and 22 ml. N - methylpiperazine is heated for 4 hours to 110°, and the mixture obtained is processed forth similarly to Example 1. The crude base obtained is dissolved in a solution of 6.0 g. maleic acid in boiling ethanol. By cooling down the solution there is precipitated 10.5 g. of the hemihydrate of the desired 8-tert.butyl-10-(4-methylpiperazino)-10,11-dihydrodibenzo(b,f)thiepine hydrogen-maleate having a melting point of 92–24°, analytically corresponding to the summary formula $C_{31}H_{38}N_2O_8S \cdot 0.5H_2O$.

The requisite crude 8-tert.butyl-10-chloro-10,11-dihydrodibenzo(b,f)thiepine is obtained from the known 4-tert.butyl-thiophenol by the following procedure:

54 g. of 4-tert.butylthiophenol is dissolved in a solution of 56 g. potassium hydroxide in 500 ml. water, 81 g.

of 2-iodo-benzoic acid and 20 g. powdered copper are added, and the mixture is heated for 6 hours to boiling under stirring. It is filtered while hot, and after cooling, the filtrate is diluted with 200 ml. water and acidified with 100 ml. conc. hydrochloric acid. The precipitated product is sucked off and recrystallized from aqueous ethanol. There is obtained 62 g. of 4'-tert.butyldiphenylsulfide-2-carboxylic acid having a melting point of 188–191°.

A solution of 5.0 g. of the said acid in 50 ml. ether is dropwise added to a suspension of 1.0 g. lithium-aluminum hydride in 25 ml. absolute ether. The mixture thus obtained is then refluxed for 5 hours under stirring. On cooling down it is decomposed with 1 ml. water and afterwards with dilute sulfuric acid. The ethereous phase is washed with a solution of sodiumhydrogencarbonate, dried, and processed by distillation. There is obtained 4.3 g. 2-hydroxymethyl-4'-tert.butyldiphenylsulfide having a boiling point of 184–186°/3 mm.

To a mixture of 25.3 g. of the latter alcohol and 7.4 g. abs. pyridine, 11.3 g. thionyl chloride is dropwise added under stirring and cooling. The mixture is stirred forth for another hour, and left at rest for 12 hours at room temperature. It is then distributed between water and ether, the ethereous phase is washed with a solution of sodium hydrogencarbonate, water, and sodium chloride solution, and dried with calcium chloride. The ether is evaporated, and the residue is distilled; 22.5 g. of 2-chloromethyl-4'-tert.butyldiphenylsulfide having a boiling point of 175–178°/3 mm. is obtained To a solution of 23.9 g. of the aforesaid chloride in 30 ml. dioxane and 30 ml. ethanol a solution of 5.5 g. sodium cyanide in 15 ml. water is added, and the mixture refluxed under stirring for 6 hrs. It is evaporated in part under reduced pressure, the residue is diluted with water and extracted with benzene. The benzeneous phase is washed, dried, and processed by distillation. There is obtained 21.8 g. of 2-cyanomethyl-4'-tert.butyldiphenylsulfide having a boiling point of 186–188°/3.5 mm.

A solution of 21.8 g. of the nitrile obtained in 115 ml. ethanol is hydrolyzed for 6 hours with a solution of 24 g. potassium hydroxide in 45 ml. water. After evaporating the ethanol, it is cooled down, diluted with water and acidified with hydrochloric acid. The product which thereby precipitates is sucked off and then crystallized from hexane; 22.1 g. 4'-tert. butyldiphenylsulfide-2-acetic acid having a melting point of 91–93° is obtained.

21.9 g. of the said acid is cyclized for 4 hours by heating with 240 g. polyphosphoric acid to 140° with stirring. After cooling down it is decomposed with water and extracted with benzene. The extract is freed of acidic substances by washing with sodium carbonate solution, dried, and processed forth by distillation. There is obtained 18.5 g. 8-tert.butyl-10-oxo-10,11-dihydrodibenzo-(b,f)thiepine, having a boiling point of 184–186°/3 mm.

The ketone thus obtained (15.5 g.) is reduced with 7.5 g. sodium borohydride in 50 ml. dioxane and 50 ml. of 90%-methanol. After 12 hours standing, the mixture is evaporated under reduced pressure, and the residue distributed between water and benzene. The benzeneous phase is washed, dried, and processed forth by distillation. There is obtained 15.1 g. 8-tert.butyl-10-hydroxy-10,11-dihydrodibenzo(b,f)thiepine, having a boiling point of 180–182°/2 mm.

The entire amount of the said alcohol (15.1 g.) is dissolved in 180 ml. benzene, and on addition of 10 g. pulverulent calcium chloride (anhydrous) is saturated for 1 hour with anhydrous hydrogen chloride. After 2 hours standing it is filtered together with active charcoal, and the filtrate is evaporated. The residual hydrogen chloride is removed by diluting with benzene and repeated evaporation under reduced pressure. The residue thus obtained consists of crude 8-tert.butyl-10-chloro-10,11-dihydrodibenzo(b,f)thiepine (12.0 g.), which is used in crude form for the final condensation.

EXAMPLE III 7-trifluoromethyl-10-(4-methylpiperazino)-10,11-dihydrodibenzo(b,f)thiepine Crude 7-trifluoromethyl-10-chloro-10,11-dihydrodibenzo-(b,f) thiepine (prepared of 2.4 g. 7-trifluoromethyl-10-oxo-10,11-dihydrodibenzo(b,f)thiepine) is mixed with 4 ml. N-methyl-piperazine, and the mixture is heated for 3 hours to 110°. On cooling down the mixture is distributed between water and benzene, and the basic product from the benzeneous phase is transferred by shaking into dilute hydrochloric acid. The hydrochloride solution thus obtained is filtered with charcoal and the filtrate is alkalized with concentrated aqueous ammonia. The liberated base is extracted with benzene and the extract washed and dried. The residue after evaporating the benzene is diluted with boiling ethanol, and the solution is neutralized with maleic acid. On diluting the thus obtained solution with ether, crystallization of the product takes place; there is obtained 1.9 g. of 7-trifluoromethyl-10-(4-methylpiperazino)-10,11-dihydrodibenzo(b,f)thiepine hydrogenmaleate, which for complete purification is recrystallized once more from an ethanol-ether mixture.

The requisite starting 7-trifluoromethyl-10-chloro-10,11-dihydrodibenzo(b,f)thiepine is prepared from the known 3-fluoromethyl-thiophenol by means of the following procedure:

29.7 g. of 3-trifluoromethyl thiophenol is dissolved in a solution of 28 g. potassium hydroxide in 250 ml. water, 41.6 g. of 2-iodobenzoic acid and 30 g. pulverous copper are added, and the mixture is refluxed for 6 hours. It is filtered while warm, and the filtrate after being diluted is acidified with hydrochloric acid. There is obtained 31.8 g. of 3'-trifluoromethyldiphenylsulfide-2-carboxylic acid, having a melting point of 147.5–148.5° (benzene).

The acid thus obtained (24.8 g.) is reduced, similarly to the preceding examples, by means of 5.0 g. lithium-aluminum hydride in 500 ml. boiling absolute ether. By processing the crude product by distillation there is obtained 15.8 g. of 2-hydroxymethyl-3'-trifluoromethyldiphenylsulfide, having a boiling point of 154–156°/3 mm.

The latter alcohol (18.6 g.) in 5.2 g. pyridine is processed while stirring by reaction with 8.0 g. thionyl chloride. After 1 hour's stirring it is left at rest for 12 hours at room temperature and the mixture is then diluted with water, and extracted with ether. The extract is washed up to a neutral reaction, dried and distilled; there is obtained 16.7 g. of 2-chloromethyl-3'-trifluoromethyldiphenylsulfide having a boiling point of 158–160°/3 mm.

A solution of 16.3 g. of the latter chloride in 50 ml. dioxane is boiled for 6 hours under reflux with a solution of 3.5 g. sodium cyanide in 10 ml. water and 15 ml. ethanol. By processing analogous to the preceding examples, there is obtained 15.8 g. of the crude 2-cyanomethyl-3'-trifluoromethyldiphenylsulfide, which is used in crude state for further processing.

The entire amount of the crude nitrile (15.8 g.) is hydrolyzed for 6 hours by boiling with a solution of 18 g. potassium hydroxide in 35 ml. water and 80 ml. ethanol. It is processed in the usual manner to form the acid, which is oily at first, but solidifies during longer staying in a crystalline form. According to analysis it is the hemihydrate of the desired 3'-fluoromethyldiphenylsulfide-2-acetic acid having a melting point of 68.5–70.5° (aqueous methanol).

A mixture of 7.0 g. of the latter acid with 70 g. polyphosphoric acid is heated under stirring for 2 hours to 100–110°. After decomposing with water, the neutral product is isolated in the usual manner, yielding 2.4 g. of 7 - trifluoromethyl-10-oxo-10,11-dihydrodibenzo(b,f) thiepine having a melting point of 89–91° (petroleum ether), and purified by vacuum sublimation.

Said ketone (2.4 g.) is dissolved in 15 ml. dioxane, 10 ml. of 90%-methanol and 1.2 g. sodium borohydride are added in portions. The mixture is maintained for 12 hours at 50–60°, on cooling down is evaporated under reduced pressure, and the residue is separated between water and benzene. The organic phase is washed, dried, and filtered. To the benzene solution of 7-trifluoromethyl-10-hydroxy - 10,11 - dihydrodibenzo(b,f)thiepine thus obtained 3 g. calcium chloride are added, and the mixture is saturated with a stream of anhydrous hydrogen chloride (1 hour). After filtering it is evaporated in vacuo, whereby the crude 7-trifluoromethyl-10-chloro-10,11-dihydrodibenzo(b,f)thiepine is obtained, suitable for the final condensation.

EXAMPLE IV 8-nitro-10-(4-methylpiperazino)-10,11-dihydrodibenzo(b,f)thiepine

A mixture of 5.0 g. of 8-nitro-10-chloro-10,11-dihydrodibenzo(b,f)thiepine and 10 ml. N-methylpiperazine is heated for 3.5 hrs. to 110–120°. On cooling down the mixture is distributed by shaking between 100 ml. water and 100 ml. benzene, the basic product from the benzeneous layer is transferred by shaking into 60 ml. dilute hydrochloric acid (1:2.5), whereat the precipitated hydrochloride portion is sucked off and suspended in the aqueous portion of the hydrochloride solution. The suspension is alkalized with 15%-sodium hydroxide solution, and the base is extracted with benzene. The extract is dried and evaporated. There is obtained 2.05 g. of the crude base of 8-nitro-10-(4-methylpiperazino)-10,11-dihydrodibenzo(b,f)thiepine. By neutralizing 2.0 g. of the base in 15 ml. ethanol with a solution of 0.7 g. maleic acid in 5 ml. ethanol, the crystalline maleate is obtained.

The requisite starting material 8-nitro-10-chloro-10,11-dihydrodibenzo(b,f)thiepine, is prepared from the known o-hydroxymethylthiophenol by the following procedure:

A mixture of 63.5 g. crude o-hydroxymethylthiophenol (prepared of 77 g. methylthiosalicylate by reduction with lithium-aluminum hydride in ether), 67 g. anhydrous potassium carbonate, 400 ml. water, 3.9 g. potassium iodide, 68.5 g. p-nitrochlorobenzene and 800 ml. ethanol is refluxed for 5 hours with stirring. The mixture is then evaporated at reduced pressure, the residue mixed with a little water, and extracted with ether. The extract is washed with water, dried with magnesium sulfate, and evaporated. The residue is crystallized from an ether-petroleum ether mixture; there is obtained 91.4 g. of 2-hydroxymethyl-4'-nitrodiphenylsulfide having a melting point of 68–69°.

To a mixture of the latter alcohol and 4.7 ml. absolute pyridine, 6.5 ml. thionyl chloride is dropwise added under stirring and cooling so as to prevent the mixture temperature from exceeding 30°. The mixture is then stirred for further 2 hours at room temperature, and finally for another 1 hour at 40°. The surplus thionyl chloride is evaporated under reduced pressure, the residue decomposed with water and extracted with ether. After washing, drying and evaporating the extract, there is obtained 9.9 g. of 2-chloromethyl-4'-nitrodiphenylsulfide having a melting point of 80–81° (cyclohexane).

To a solution of 12.9 g. of the latter chloride in 30 ml. ethanol and 18 ml. dioxane, a solution of 3 g. sodium cyanide in 6 ml. ethanol is added and the mixture is boiled under stirring for 8 hours under reflux. By the usual processing of the mixture (according to the previous examples) there is obtained 11.2 g. 2-cyanomethyl-4'-nitrodiphenylsulfide, which for the purpose of analysis is crystallized from a benzene-petroleum ether mixture, or from pure ethanol; melting point 96–98°.

A mixture of 10 g. of the said nitrile, 10 ml. water, 10 ml. acetic acid and 10 ml. sulfuric acid is refluxed under stirring for 1.5 hours. After partial cooling down, the mixture is poured into ice and then extracted by shaking with ether. The ethereous solution is washed with water up to a neutral reaction, and the acid product is transferred by shaking into a 10%-sodium carbonate solution. The alkaline solution thus obtained is separated and acidified with hydrochloric acid. By sucking off there is obtained 8.55 g. of 4'-nitrodiphenylsulfide-2-acetic acid, which is recrystallized from ethanol; melting point 141–142°.

The acid thus obtained (5.0 g.) is cyclized by heating with 25 g. polyphosphoric acid to 150–155° for 2 hours. After cooling down the mixture is decomposed with ice and water, and the neutral product isolated in usual manner. There is obtained, in a yield of 3.45 g., 8-nitro-10-oxo-10,11-dihydrodibenzo(b,f)thiepine, in the form of a crystalline substance melting at 174–175° (benzene).

A solution of 20 g. of the said ketone in 750 ml. dioxane is reduced by means of 7.5 g. sodium borohydride in 70 ml. of a dioxane-water mixture. The reaction mixture is stirred for 5 hours at room temperature, then diluted with water, and neutralized with dilute sulfuric acid. The 8 - nitro - 10 - hydroxy - 10,11 - dihydrodibenzo(b,f)thiepine thus eliminated is sucked off and recrystallized from benzene; 19 g., melting point 191–192°.

A solution of 2.0 g. of the latter alcohol and 1 ml. pyridine in 10 ml. absolute benzene and 5 ml. absolute chloroform is cooled down to 0°, at which temperature 0.85 g. thionyl chloride is dropwise added with stirring. The mixture is stirred for further 2 hours at room temperature, and then heated for 15 min. to 30°. Thereupon it is decomposed with ice, extracted with benzene, and the benzeneous solution is evaporated after being washed and dried. There is obtained 2.2 g. of a crystalline evaporation residue, which is recrystallized from a benzene-cyclohexane mixture. The thus obtained pure 8-nitro-10-chloro-10,11-dihydrodibenzo(b,f)thiepine has a melting point of 137–138°.

EXAMPLE V 8-methoxy-10-(4-methylpiperazino)-10,11-dihydrodibenzo(b,f)-thiepine ("octometothepine")

A mixture of 10 g. 8 - methoxy - 10 - chloro-10,11-dihydrodibenzo(b,f)thiepine and 20 g. N - methylpiperazine is heated for 3.5 hrs. to 115–125° (bath temperature). After being cooled down, it is decomposed with water and processed similarly to the preceding example. There is obtained 6.05 g. of the desired base 8-methoxy - 10 - (4-methylpiperazino)-10,11-dihydrodibenzo(b,f)thiepine, melting point 80–82°. Neutralized with an equivalent amount of maleic acid in ethanol, it yields the normal maleate with having a melting point of 207–209° (ethanol).

The requisite starting material, 8-methoxy-10-chloro-10,11 - dihydro-dibenzo(b,f)thiepine is prepared of the known 4' - methoxydiphenylsulfide-2-carboxylic acid by the following procedure:

To a suspension of 10 g. lithium-aluminum hydride in 400 ml. absolute ether, a suspension of 50 g. 4'-methoxydiphenylsulfide-2-carboxylic acid in 300 ml. absolute tetrahydrofurane and 100 ml. absolute ether is dropwise added. The mixture is refluxed for 6 hours and then processed in the usual manner (see the preceding examples). There is obtained in an almost theoretical yield 2 - hydroxymethyl - 4' - methoxydiphenylsulfide having a melting point of 47.5–48.5° (ether-petroleum ether).

To a solution of 20 g. of the said alcohol in 25 ml. absolute chloroform, 11 ml. absolute pyridine is added, and under cooling with ice a solution of 14.4 g. thionyl chloride in 35 ml. chloroform is dropwise added. The mixture is stirred for 2 hours at room temperature, decomposed with water, acidified with hydrochloric acid, and extracted with chloroform. The extract is washed with a sodium hydrogencarbonate solution, then with water, dried with anhydrous calcium chloride, and evaporated. There is obtained 19 g. of crude 2-chloromethyl-4'-methoxydiphenylsulfide, which is recrystallized from methanol or from a cyclohexane-acetone mixture; melting point 83–84°.

To a solution of 5.0 g. of the latter chloride in 25 ml. absolute acetone 1.4 g. sodium cyanate and 0.2 sodium iodide are added, and the mixture is refluxed under stirring for 16 hours. On cooling down, it is filtered, the filtrate evaporated, and the residue dissolved in benzene. The benzeneous solution is washed with water, dried, and evaporated. There is obtained 4.5 g. of 2-cyanomethyl-4'-methoxydiphenylsulfide with having a melting point of 57–59° (cyclohexane).

The said crude nitrile (16 g.) is hydrolyzed for 5 hours by boiling with a solution of 15 g. potassium hydroxide in 30 ml. water and 70 ml. ethanol. After having evaporated the mixture, the residue is processed in the usual manner, whereby an acid product is isolated. There is obtained 11 g. of the crystalline 4'-methoxydiphenylsulfide-2-acetic acid, melting point 103–104° (aqueous ethanol).

The said acid (5.4 g.) is cyclized by 20 hours boiling with a mixture of 25 g. polyphosphoric acid and 100 ml. absolute toluene. After partial cooling down, the tolueneous layer is poured off and the residue is reboiled three times with toluene, whereat the tolueneous solutions are united. They are washed with water, 5%-sodium hydroxide solution, and with water again, dried with anhydrous magnesium sulfate, and evaporated. There is obtained 4.3 g. of the crystalline 8-methoxy-10-oxo-10,11-dihydrodibenzo(b,f)thiepine having a melting point of 97–98° (cyclohexane).

Said ketone (10 g.) is reduced, similarly to the foregoing examples, by means of 5.3 g. sodium borohydride in 200 ml. ethanol and 25 ml. water. There is obtained, in a yield of 8.9 g., the crystalline 8-methoxy-10-hydroxy-10,11-dihydrodibenzo(b,f)thiepine, melting point 93–94° (cyclohexane).

A solution of 5.0 g. of the latter alcohol in 70 ml. absolute benzene is saturated with a stream of anhydrous hydrogen chloride. After about 15 minutes 2.5 g. anhydr.calcium chloride is added and saturation with HCl continued for a further 1 hour. After standing overnight it is sucked off, and the benzeneous filtrate is evaporated. By crystallizing the evaporation residue from cyclohexane there is obtained 4.6 g. of the desired 8-methoxy-10-chloro-10,11-dihydrodibenzo(b,f)thiepine having a melting point of 115.5–116.5°.

EXAMPLE VI 8-methylthio-10-(4-methylpiperazino)-10,11-dihydrodibenzo(b,f)thiepine A mixture of 10.2 g. of 8-methylthio-10-chloro-10,11-dihydrodibenzo(b,f)thiepine and 20 ml. N-methylpiperazine is heated for 2 hours to 125°. After standing overnight it is distributed by shaking between benzene and a dilute sodium hydroxide solution, and the benzeneous solution is processed similarly to the foregoing examples. The crude base obtained is directly converted by neutralization with 2.05 g. maleic acid in ethanol to the normal maleate of 8-methylthio-10-(4-methylpiperazino)-10,11-dihydrodibenzo(b,f)thiepine, which is obtained in a yield of 7.4 g.; melting point 160–161° ethanol.

The requisite starting 8-methylthio-10-chloro-10,11-dihydrodibenzo(b,f)thiepine is prepared of the known p-methylthio-thiophenol by the following procedure:

To a solution of 9.2 g. potassium hydroxide in 95 ml. water 0.3 g. pulverous copper is added, and thereupon 8.5 g. p-methylthio-thiophenol and after its dissolving 13.5 g. o-iodobenzoic acid in addition to it. The mixture is refluxed for 6 hours under stirring, is sucked off while warm with activated charcoal, and by acidifying with concentrated hydrochloric acid the desired 4'-methylthiodiphenylsulfide-2-carboxylic acid is obtained, which is sucked off, and recrystallized by being dissolved in 100 ml. boiling ethanol with an addition of the just necessary quantity of concentrated aqueous ammonia, and thereupon while hot, it is acidified with acetic acid. There is precipitated 13.2 g. of the product in the form of white needles, melting point 197–199°.

Said acid (27.6 g.) is reduced, similarly to the preceding examples, by means of 5.0 g. lithium-aluminum hydride in a mixture of 200 ml. ether and 150 ml. absolute tetrahydrofurane. There is obtained, in a yield of 23.5 g. 2-hydroxymethyl-4'-methylthiodiphenylsulfide having a melting point of 56–58° (benzene-petroleum ether).

To a solution of 36 g. of the latter alcohol in 80 ml. benzene, 24.5 g. thionyl chloride is dropwise added so as to keep the mixture gently boiling under reflux. It is refluxed for further 10 min. and evaporated under reduced pressure. By crystallizing the evaporation residue from a benzene-petroleum ether mixture there is obtained 27.8 g. of 2-chloromethyl-4'-methylthiodiphenylsulfide having a melting point of 59–61°.

To a solution of 13.4 g. potassium cyanide in 20 ml. water a warm solution of 27.8 g. of the latter chloride in 50 ml. ethanol is added, and the mixture is refluxed under stirring for 7 hours. After cooling down, it is strongly diluted with water and extracted with ether. The extract is dried with anhydrous potassium carbonate, evaporated, and the residue redistilled in vacuo. There is obtained in a yield of 23.4 g. the desired 2-cyanemethyl-4'-methylthiodiphenylsulfide having a boiling point of 175–180°/0.1 mm., which by standing solidifies to form a crystalline substance, melting point 39–41° (benzene-petroleum ether).

Said nitrile (6.4 g.) is hydrolyzed by 4 hours boiling with a solution of 6.4 g. potassium hydroxide in 6 ml. water and 40 ml. ethanol. After diluting with water, it is filtered together with activated charcoal, and by acidification of the filtrate the desired 4'-methylthiodiphenylsulfide-2-acetic is precipitated in a yield of 5.0 g., melting point 117–119° (benzene-petroleum ether).

21 g. of the said acid is added under stirring at 125–135° to polyphosphoric acid freshly prepared of 65 ml. 85%-phosphoric acid and 129 g. phosphorus pentoxide, and the mixture is kept for a half-hour at the aforesaid temperature. After cooling down it is decomposed with ice, and the neutral product isolated in the usual manner. There is obtained in a yield of 17.2 g. the desired 8-methylthio-10-oxo-10,11-dihydrodibenzo(b,f)thiepine, melting point 88–90° (benzene-petroleum ether).

The reduction of 1.85 g. of the latter ketone by means of 0.52 g. sodium borohydride in 20 ml. ethanol is carried out similarly to the previous examples. There is obtained 1.75 g. of 8-methylthio-10-hydroxy-10,11-dihydrodibenzo(b,f)thiepine, melting point 118–118° (aqueous ethanol).

Said alcohol (10 g.) is dissolved in 80 ml. benzene, and the solution is saturated with anhydrous hydrogen chloride. On getting turbid, 4 g. of anhydrous (pulverulent) calcium chloride is added, and the saturation with anhydrous hydrogen chloride continued for about another hour. After 1 hour's standing it is filtered and the filtrate evaporated. There is obtained 10.6 g. of crude crystalline 8-methylthio-10-chloro-10,11-dihydrodibenzo(b,f)thiepine, which for the analysis is recrystallized from a benzene-petroleum ether mixture, melting point 106–108°.

EXAMPLE VII 8-methanesulfonyl-10-(4-methylpiperazino)-10,11-dihydrodibenzo(b,f)thiepine A mixture of 3.7 g. of 8-methanesulfonyl-10-chloro-10,11-dihydrodibenzo(b,f)thiepine and 11.5 ml. N-methylpiperazine is heated for 2 hours to 120–125° (bath temperature). After cooling down it is distributed between a dilute sodium hydroxide solution and benzene, and the basic product is isolated in a manner similar to that described in the preceding examples. There is obtained 1.4 g. of the crude base of 8-methanesulfonyl-10-(4-methylpiperazino)-10,11-dihydrodibenzo(b,f)thiepine, which on neutralization with maleic acid yields 1.5 g. of the pure maleate having a melting point of 141–143° (ethanol-ether).

The requisite starting material, 8-methanesulfonyl-10-chloro-10,11-dihydrodibenzo(b,f)thiepine, is prepared of the known p-bromophenylmethylsulfone by the following procedure:

A mixture of 8.1 g. thiosalicylic acid, 11.7 g. p-bromophenylmethylsulfone and 0.5 g. pulverulent copper is heated to 120° and homogenized by stirring. Thereupon 7.1 g. anhydrous potassium carbonate is slowly brought in (in parts). As shown as foaming is ended, heating is continued and the mixture is heated under stirring up to 195°. On cooling down, the solidified melt is extracted with 200 ml. boiling water, the solution filtered together with activated charcoal, and the filtrate acidified with hydrochloric acid. The product which precipitates thereby is sucked off, washed with water, dried in air, and recrystallized from an ethanol-ether mixture. There is obtained 11.1 g. of 4'-methanesulfonyldiphenylsulfide-2-carboxylic acid having a melting point of 184–186° (ethanol).

Said acid (9.1 g.) is reduced, as described in the preceding examples, by means of 1.5 g. lithium-aluminum hydride in 70 ml. ether and 50 ml. tetrahydrofurane. By the usual processing there is regenerated 2.6 g. of the unreacted starting acid, and 4.5 g. of 2-hydroxymethyl-8-methanesulfonyldiphenylsulfide having a melting point of 55–57° (toluene) are obtained.

To a solution of 3.8 g. of the latter alcohol in 8 ml. absolute benzene, 1 drop of pyridine is added, and 1.4 ml. thionyl chloride is dropwise added. The mixture is refluxed for 15 minutes and evaporated to dryness under reduced pressure. The oily residue crystallizes slowly, and is then recrystallized from a benzene-petroleum ether mixture. There is obtained 2.5 g. of 2-chloromethyl-4'-methanesulfonyldiphenylsulfide having a melting point of 63–65°.

A mixture of solutions of 9.1 g. of the said chloride in 12 ml. ethanol, and 3.75 g. potassium cyanide in 5.5 ml. water is refluxed for 7 hours under stirring. On diluting with water, the desired 2 cyanomethyl-4'-methanesulfonyldiphenylsulfide is precipitated in a crystalline form so that it can be sucked off and recrystallized from a benzene-ether mixture; 8.65 g. melting point 128–130°.

The hydrolysis of said nitrile (8.0 g.) with alcoholic potassium hydroxide is carried out similarly to the preceding example. There is obtained 6.5 g. of 4'-methanesulfonyldiphenylsulfide-2-acetic acid, which crystallizes from aqueous ethanol or of benzene, melting point 137–138°.

The cyclization of the said acid (4.0 g.) is carried out with aid of polyphosphoric acid (freshly prepared of 8 ml. of a 85%-phosphoric acid and 12 g. phosphorus pentoxide) by 1 hour's heating to 140°. After decomposing the reaction mixture with water, the neutral product is isolated in the usual manner, and recrystallized from a chloroform-ether mixture. There is obtained 3.0 g. of the desired 8 - methanesulfonyl-10-oxo-10,11-dihydrodibenzo(b,f)thiepine, melting point 190–192°.

Said ketone (4.7 g.) is reduced, as described in the preceding examples, by means of 1.2 g. sodium borohydride in 75 ml. ethanol. There is obtained 3.3 g. of pure 8-methanesulfonyl - 10-hydroxy-10,11-dihydrodibenzo(b,f)thiepine, melting point 127–128° (benzene - ethanol - petroleum ether).

A solution of 1.4 g. of the latter alcohol in 20 ml. benzene is saturated with anhydrous hydrogen chloride, the mixture cleared of the reaction water with anhydrous calcium chloride, filtered and evaporated. From the evaporation residue there is obtained by crystallizing from a benzene-ether-petroleum ether mixture 1.25 g. of 8-methanesulfonyl - 10 - chloro-10,11-dihydrodibenzo(b,f)thiepine having a melting point of 120–121°.

EXAMPLE VIII 8-(dimethylsulfamyl)-10-(4-methylpiperazino) 10,11-dihydrodibenzo(b,f)thiepine A mixture of 1.15 g. of 8-(dimethylsulfamyl)-10-chloro-10,11-dihydrodibenzo(b,f)thiepine and 3.5 ml. N-methylpiperazine is heated for 2 hours to 115–120°. On cooling down it is distributed by shaking between a dilute sodium hydroxide solution and benzene. The organic phase is separated, washed with water, and the base thereof is transferred by shaking into dilute sulfuric acid. The sulfate solution thus obtained is filtered, and is re-liberated by alkalizing the base. It is extracted again with benzene, the extract is dried and evaporated. The residue represents 0.45 g. of crude, oily 8-(dimethylsulfamyl)-10-(4-methylpiperazino)-10,11-dihydrodibenzo(b,f)thiepine, which is neutralized with 0.125 g. maleic acid in ethanol. Diluting the solution obtained with ether, the desired maleate is precipitated in a yield of 0.50 g. (altogether 31%).

The requisite starting material, 8-(dimethylsulfamyl)-10-chloro-10,11-dihydrodibenzo(b,f)thiepine, is prepared of the known N,N-dimethyl-p-bromobenzenesulfonamide by the following procedure:

A mixture of 8.1 g. thiosalicylic acid, 13.2 g. N,N-dimethyl-p-bromobenzenesulfonamide, and 0.5 g. pulverous copper is homogenized by melting at 140° and stirring. Without further heating 7.1 g. anhydrous sodium carbonate is then slowly brought in and, after foaming is ended, the mixture is heated under stirring to 195–200° and kept at this temperature for 20 minutes. After being cooled down it is extracted by boiling with 80 ml. water, the solution is sucked off with charcoal and the filtrate acidified with hydrochloric acid. The crude product which is precipitated in this manner is recrystalized from ethanol under addition of activated charcoal. There is obtained in a yield of 11.25 g. 4'-(dimethylsulfamyl)diphenylsulfide-2-carboxylic acid, melting point 178–180°.

To a solution of 1.6 g. lithium-aluminum hydride in 50 ml. absolute tetrahydrofurane a solution of 10.75 g. of the latter acid in an additional 50 ml. tetrahydrofurane is dropwise added within half an hour. The mixture is refluxed for 5 hours and, after being cooled down, it is decomposed with 45 ml. water and then with 80 ml. dilute hydrochloric acid (1:3). On extraction with benzene and the usual processing of the extract, there is obtained 9.1 g. of an oily product, which is dissolved in benzene containing 5% of ethanol, and the solution is filtered over an alumina column. The first, least polar, fraction is discarded, and by evaporating the next eluates there is obtained 8.5 g. of the refined product, which slowly crystallizes from a benzene-ether mixture. In this way 6.15 g. of 2 - hydroxymethyl - 4'-(dimethylsulfamyl)diphenylsulfide having a melting point of 87–88° are obtained.

Said alcohol (5.75 g.) is dissolved in 12 ml. boiling benzene, a drop of pyridine is added, and 2 ml. thionyl chloride are dropwise added. The mixture is refluxed for 15 minutes and thereupon evaporated in vacuo. The residue is recrystallized from a benzene-ether mixture. There is obtained 5.15 g. of 2-chloromethyl-4'-(dimethylsulfamyl)diphenylsulfide, melting point 99–101° (benzene-ether).

A solution of 4.6 g. of the latter chloride in 6 ml. ethanol is mixed with a solution of 1.75 g. potassium cyanide in 2.5 ml. water, and the mixture is refluxed for 5 hours under stirring. By pouring into water, a crude crystalline product is precipitated, which is sucked off and recrystallized from aqueous ethanol. There is obtained 3.55 g. of 2 - cyanomethyl - 4' - (dimethylsulfamyl)-diphenylsulfide having a melting point of 79–80°.

Said nitrile (2.55 g.) is hydrolyzed with a aqueous-alcoholic solution of potassium hydroxide (2.5 g. KOH, 2.5 ml. water, 25 ml. ethanol) by 5 hours boiling under reflux. After diluting with water, it is filtered and the filtrate acidified with hydrochloric acid. The crude product precipitated in this manner, after being sucked off, is recrystallized from aqueous ethanol. There is obtained 1.35 g. of 4'-(dimethylsulfonyl)diphenylsulfide-2-acetic acid having a melting point of 160–162°.

The latter acid (2.0 g.) is cyclized by 4 hours boiling with a mixture of 10 ml. toluene and polyphosphoric acid, freshly prepared of 6 g. phosphorus pentoxide and 5 ml. 85%-phosphoric acid. After cooling down, the mixture it is decomposed with ice, and the neutral product is isolated in the usual manner. There is obtained in a yield of 53% the 8 - (dimethylsulfamyl)-10-oxo-10,11-dihydrodibenzo(b,f)thiepine.

Said ketone (3.0 g.) is reduced by means of 0.68 g. sodium borohydride in 45 ml. ethanol. The mixture is refluxed under stirring until the ketone is dissolved. After standing overnight, it is diluted with water, acidified with hydrochloric acid, and the product is extracted with benzene. The extract is washed with water, dried, and evaporated. In this way 1.55 g. of crude 8-(dimethylsulfamyl) - 10-hydroxy-10.11-dihydrodibenzo(b,f)thiepine is obtained, which may be used without further purification.

A solution of the latter carbinol in 15 ml. benzene, to which 0.7 g. powdered calcium chloride had been added, is saturated for 4 hours with anhydrous hydrogen chloride. Thereupon it is filtered and evaporated under reduced pressure. The residue (1.7 g.) constitutes the crude 8-(dimethylsulfamyl) - 10 - chloro - 10,11 - dihydrodibenzo-(b,f)-thiepine, suitable for further processing.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of heterocyclic compounds of the formula:

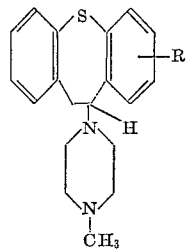

wherein R is selected from the group consisting of alkyl, perfluoroalkyl, alkoxyl, alkylmercapto, alkanesulfonyl and dialkylsulfamyl with 1–4 carbon atoms, the nitro group, and pharmaceutically acceptable salts thereof.

2. A compound as defined in claim 1, wherein said heterocyclic compound is the compound of said formula.

3. A compound as defined in claim 1, wherein said compound is a salt of said compound of said formula.

4. A compound as defined in claim 3, wherein said salt is selected from the group consisting of the maleates and hydrogen maleates of said compound of said formula.

5. A compound as defined in claim 1, wherein R is selected from the group consisting of methyl, butyl, trifluoromethyl, nitro, methoxy and methylthio.

6. A compound as defined in claim 1, wherein said compound is selected from the group consisting of
8-methyl-10(4-methylpiperazino)-10,11-dihydrodibenzo(b,f)thiepine,
8-tert.butyl-10-(4-methylpiperazino)-10,11-dihydrodibenzo(b,f)thiepine,
7-trifluoromethyl-10-(4-methylpiperazino)-10,11-dihydrodibenzo(b,f)thiepine,
8-nitro-10-(4-methylpiperazino)-10,11-dihydrodibenzo(b,f)-thiepine,
8-methoxy-10-(4-methylpiperazino)-10,11-dihydrodibenzo(b,f)thiepine,
8-methylthio-10-(4-methylpiperazino)-10,11-dihydrodibenzo(b,f)thiepine,
8-methanesulfonyl-10-(4-methylpiperazino)-10,11-dihydrodibenzo(b,f)thiepine and
8-dimethylsulfamyl-10-(4-methylpiperazino)-10,11-dihydrodibenzo(b,f)thiepine,
and the maleates and hydrogen maleates thereof.

7. A compound as defined in claim 1, wherein said compound is 8-methyl-10-(4-methylpiperazino)-10,11-dihydrodibenzo(b,f)-thiepine.

8. A compound as defined in claim 1, wherein said compound is 8-tert.butyl-10-(4-methylpiperazino)10,11-dihydrodibenzo(b,f)-thiepine.

9. A compound as defined in claim 1, wherein said compound is 7-trifluoromethyl-10-(4-methylpiperazino)-10,11-dihydrodibenzo(b,f)-thiepine.

10. A compound as defined in claim 4, wherein said compound is 8-nitro-10-(4-methylpiperazino)-10,11-dihydrobenzo(b,f)-thiepine.

11. A compound as defined in claim 1, wherein said compound is 8-methoxy-10-(4-methylpiperazino)-10,11-dihydrodibenzo(b,f)-thiepine.

12. A compound as defined in claim 1, wherein said compound is 8-methylthio-10-(4-methylpiperazino)-10,11-dihydrodibenzo(b,f)-thiepine.

13. A compound as defined in claim 1, wherein said compound is 8-methanesulfonyl-10-(4-methylpiperazino)-10,11-dihydrodibenzo(b,f)-thiepine.

compound is 8-dimethylsulfamyl-10-(4-methylpiperazino)-10,11-dihydrodibenzo(b,f)-thiepine.

14. A compound as defined in claim 1, wherein said compound is 8-dimethylsulfamyl-10-(4-methylpiperazino)-10,11-dihydrodibenzo(b,f)-thiepine.

No references cited.

HENRY R. JILES, *Primary Examiner.*